United States Patent
Choi et al.

(10) Patent No.: US 8,488,781 B2
(45) Date of Patent: Jul. 16, 2013

(54) METHOD FOR IMPLEMENTING SYMMETRIC KEY ENCRYPTION ALGORITHM AGAINST POWER ANALYSIS ATTACKS

(75) Inventors: Doo Ho Choi, Cheonan-si (KR); Yong-Je Choi, Daejeon (KR); You Sung Kang, Daejeon (KR); Ju Han Kim, Daejeon (KR); Tae sung Kim, Daejeon (KR); Kyung hee Oh, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 13/474,655

(22) Filed: May 17, 2012

(65) Prior Publication Data

US 2012/0294439 A1    Nov. 22, 2012

(30) Foreign Application Priority Data

May 18, 2011    (KR) ........................ 10-2011-0047064

(51) Int. Cl.
*G06F 21/24*    (2006.01)

(52) U.S. Cl.
USPC .................. 380/28; 380/29; 380/37; 380/46; 380/205; 380/252

(58) Field of Classification Search
None
See application file for complete search history.

(56) References Cited

U.S. PATENT DOCUMENTS

| 2002/0027987 | A1* | 3/2002 | Roelse | 380/29 |
| 2004/0184602 | A1* | 9/2004 | Nadehara | 380/28 |
| 2006/0109981 | A1* | 5/2006 | Sexton | 380/28 |
| 2006/0177052 | A1* | 8/2006 | Hubert | 380/29 |
| 2008/0019503 | A1* | 1/2008 | Dupaquis et al. | 380/28 |
| 2010/0086126 | A1* | 4/2010 | Yokota et al. | 380/28 |

FOREIGN PATENT DOCUMENTS

KR    100737171 B1    3/2007

OTHER PUBLICATIONS

Mehran Mozaffari-Kermani and Arash Reyhani-Masoleh,A Low-Cost S-box for the Advanced Encryption Standard Using Normal Basis, IEEE. pp. 52-55, 2009.*
Najeh Kamoun , Lilian Bossuet , Adel Ghazel, SRAM-FPGA Implementation ofMasked S-Box Based DPA countermeasure for AES, IEEE, 2008.*
D. Canright and Lejla Batina, A Very Compact "Perfectly Masked" S-Box for AES, Applied Math., Naval Postgraduate School, Monterey CA, USA, 2009.*
Nicolas T. Courtois and Louis Goubin, An Algebraic Masking Method to Protect AES Against Power Attacks, PRiSM Versailles University, France, 2006.*

* cited by examiner

*Primary Examiner* — Andrew L Nalven
*Assistant Examiner* — Amir Mehrmanesh

(57) ABSTRACT

Disclosed is a method for implementing a symmetric key encryption algorithm against power analysis attacks, including: generating and storing an affine transform table; generating and storing a masked inversion table; and operating a masked S-box using the affine transform table and the masked inversion table.

6 Claims, 5 Drawing Sheets

METHOD FOR IMPLEMENTING SYMMETRIC KEY ENCRYPTION ALGORITHM AGAINST POWER ANALYSIS ATTACKS

CROSS-REFERENCES TO RELATED APPLICATIONS

The present application claims priority under 35 U.S.C. 119(a) to Korean Application No. 10-2011-0047064, filed on May 18, 2011, in the Korean Intellectual Property Office, which is incorporated herein by reference in its entirety set forth in full.

BACKGROUND

Exemplary embodiments of the present invention relate to a method for coping with power analysis attacks, and more particularly, to a method for implementing symmetric key encryption algorithm against power analysis attacks for reducing a memory and execution time that occur at the time of implementing the symmetric key encryption algorithm.

Generally, a symmetric key encryption algorithm is referred to as a block encryption algorithm and encrypts and decrypts data having a predetermined unit block with the same key and is operated with a multi-mode for implementing intensive encryption.

Power/electromagnetic wave power analysis attacks, which are one of powerful attack mechanisms against a symmetric key encryption algorithm, are a big threat factors against security products.

The power/electromagnetic wave power analysis attacks are an attack method that collects electromagnetic waves generated at the time of driving an encryption algorithm or consumed power and statistically analyzes the collected electromagnetic waves to analyze secrete information, for example, key information, of the encryption algorithm.

The symmetric key encryption algorithm has proposed various mechanisms for preventing power/electromagnetic wave sub-channel analysis attacks.

Among those, a masking mechanism is a representative method for preventing power analysis attacks at an encryption algorithm level. The masking mechanism is a method that cannot expect a median value of encryption operation by adding or XORing random data to data to be originally encrypted and cannot statistically analyze collected power waveforms or electromagnetic wave data.

The above-mentioned technical configuration is a background art for helping understanding of the present invention and does not mean related arts well known in a technical field to which the present invention pertains.

The related art uses an S-box as a non-linear function in a symmetric key encryption algorithm.

As described above, when implementing the symmetric key encryption algorithm by the masking method for preventing power analysis attacks, a memory for generating a masked S-box table is additionally consumed and masking operation needs to be performed for each round, which results in additionally increasing the execution time.

SUMMARY

An embodiment of the present invention is directed to a method for implementing a symmetric key encryption algorithm against power analysis attacks capable of reducing memory consumption and execution time by previously generating and storing a masked inversion table and an affine transform table and calculating a masked S-box using the generated and stored maps.

An embodiment of the present invention relates to A method for implementing a symmetric key encryption algorithm against power analysis attacks includes: generating and storing an affine transform table; generating and storing a masked inversion table; and operating a masked S-box using the affine transform table and the masked inversion table.

The masked inversion table may be generated using a inversion table for a product inverse function of the binary field $GF(2^8)$ and an output masked value.

The inversion table for the product inverse function of $GF(2^8)$ may be pre-stored.

The masked inversion table may be generated by XORing the inversion table and the output masked value.

The affine transform table may include an affine transform table of an affine transform A of the binary field $GF(2^8)$, $A^{-1}$ affine transform table, D affine transform table and $D^{-1}$ affine transform table.

At the operating of the masked S-box using the affine transform table and the masked inversion table, the masked S-box may be operated for each round by using the affine transform table and the masked inversion table according to $$MS(x')=A \cdot MI(x'' \oplus r) \oplus a', \ MS^{-1}(x')=MI(A^{-1} \cdot (x' \oplus a) \oplus b) \oplus c,$$

and $MS(x')$ is the masked S-box, $MS^{-1}(x')$ is inverse of the masked S-box, A is an affine transform table, $A^{-1}$ is inverse of the affine transform table, a is a constant, b is a constant, c is a 8-bit constant, x' is an input variable of the S-box of 8-bit, x'' is a value of 8-bit, a' is a 8-bit constant, and r is an input masked value.

The operating of the masked S-box using the affine transform table and the masked inversion table may commonly use the affine transform table and the masked inversion table for each round.

BRIEF DESCRIPTION OF THE DRAWINGS

The above and other aspects, features and other advantages will be more clearly understood from the following detailed description taken in conjunction with the accompanying drawings, in which:

FIG. 4 is a diagram illustrating a inversion table of FIG. 3;

FIG. 5 is a diagram illustrating an affine transform table of FIG. 3;

FIG. 6 is a diagram illustrating an $A^{-1}$ affine transform table of FIG. 3;

FIG. 7 is a diagram illustrating a D affine transform table of FIG. 3; and

FIG. 8 is a diagram illustrating a $D^{-1}$ affine transform table of FIG. 3.

DESCRIPTION OF SPECIFIC EMBODIMENTS

Hereinafter, embodiments of the present invention will be described with reference to accompanying drawings. However, the embodiments are for illustrative purposes only and are not intended to limit the scope of the invention.

Figure 1:
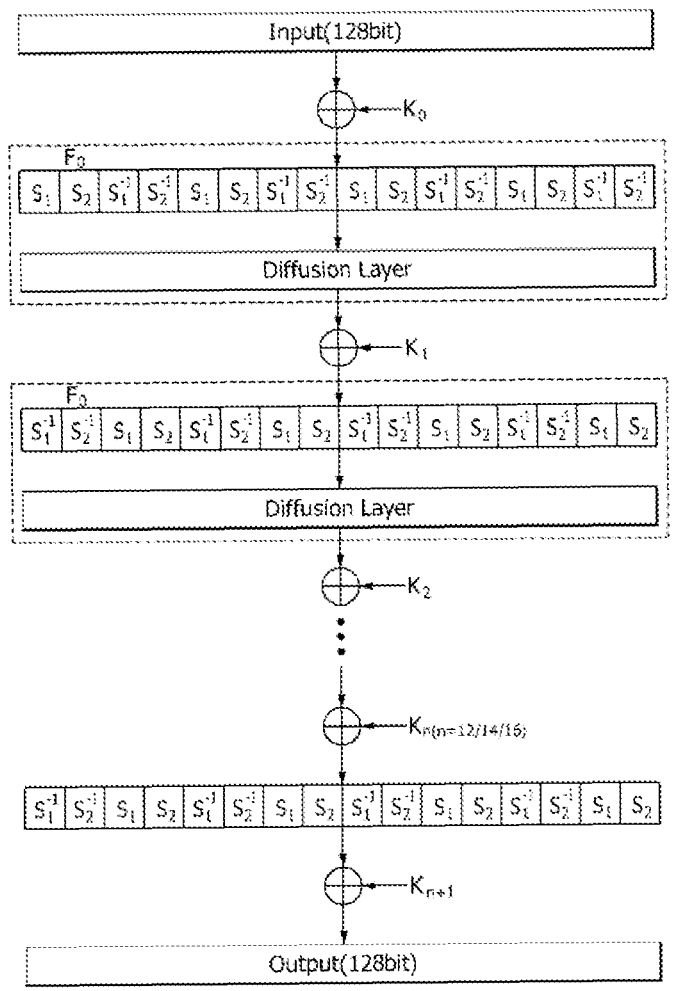
FIG. 1 is a diagram illustrating an overall ARIA structure.

FIG. 1 is a diagram illustrating an overall ARIA structure.

A general academy research institute agency (ARIA) configures a round function including a substitution layer, a diffusion layer, and a key edition.

A fundamental structure is an involutional substitution permutation networks (ISPN) structure and an input and output size is 128 bits. A key size is 128/192/256 bits, a round key size is 128 bits, and the number of rounds is 12/14/16 rounds according to the key size.

In FIG. 1, the substitution layer uses four S-boxes ($S_1$, $S_2$, $S_1^{-1}$, $S_2^{-1}$) that are configured of two S-boxes and S-boxes formed by inversely substituting the two S-boxes.

The S-boxes ($S_1$, $S_2$) perform the operation in an affine transform type of $x^{-1}$ and $Dx^{-1}$.

The two S-boxes ($S_i$, $S_2$) uses the two S-boxes ($S_1^{-1}$, $S_2^{-1}$) that are the inverse substitution thereof to configure the substitution layer in the round function of the ARIA.

As described below, the diffusion layer of the ARIA is configured of a 16×16 binary matrix and operates a value of output 16 bytes ($y_0, y_1, \ldots, y_{15}$) with respect to input 16 bytes ($x_0, x_1, \ldots, x_{15}$) by a matrix product.

$$\begin{pmatrix} y_0 \\ y_1 \\ y_2 \\ y_3 \\ y_4 \\ y_5 \\ y_6 \\ y_7 \\ y_8 \\ y_9 \\ y_{10} \\ y_{11} \\ y_{12} \\ y_{13} \\ y_{14} \\ y_{15} \end{pmatrix} = \begin{pmatrix} 0&0&0&1&1&0&1&0&1&1&0&0&0&1&1&0 \\ 0&0&1&0&0&1&0&1&1&1&0&0&1&0&0&1 \\ 0&1&0&0&1&0&1&0&0&0&1&1&1&0&0&1 \\ 1&0&0&0&0&1&0&1&0&0&1&1&0&1&1&0 \\ 1&0&1&0&0&1&0&0&1&0&0&1&0&0&1&1 \\ 0&1&0&1&1&0&0&0&0&1&1&0&0&0&1&1 \\ 1&0&1&0&0&0&0&1&0&1&1&0&1&1&0&0 \\ 0&1&0&1&0&0&1&0&1&0&0&1&1&1&0&0 \\ 1&1&0&0&1&0&0&1&0&0&1&0&0&1&0&1 \\ 1&1&0&0&0&1&1&0&0&0&0&1&1&0&1&0 \\ 0&0&1&1&0&1&1&0&1&0&0&0&0&1&0&1 \\ 0&0&1&1&1&0&0&1&0&1&0&0&1&0&1&0 \\ 0&1&1&0&0&0&1&1&0&1&0&1&1&0&0&0 \\ 1&0&0&1&0&0&1&1&1&0&1&0&0&1&0&0 \\ 1&0&0&1&1&1&0&0&0&1&0&1&0&0&1&0 \\ 0&1&1&0&1&1&0&0&1&0&1&0&0&0&0&1 \end{pmatrix} \cdot \begin{pmatrix} x_0 \\ x_1 \\ x_2 \\ x_3 \\ x_4 \\ x_5 \\ x_6 \\ x_7 \\ x_8 \\ x_9 \\ x_{10} \\ x_{11} \\ x_{12} \\ x_{13} \\ x_{14} \\ x_{15} \end{pmatrix}$$

However, various actions have been introduced by proposing the power analysis attacks. The masking mechanism is a method that cannot expect a median value by adding or XOR-ing random data to data to be originally encrypted.

However, the masking mechanism operates the masked S-box for each round, thereby greatly increasing a memory and execution time.

As described above, the S-box used for non-linear function in a symmetric key algorithm is configured of a function of a binary field $GF(2^8)$ and is mainly decomposed in a form described in Equation 1. Here, Equation 1 represents an S-box function configuration principle of the symmetric key encryption.

$S: GF(2^8) \to GF(2^8)$, $S(x) = A \cdot x^{-1} \oplus a$, $S^{-1}(x) = (A^{-1} \cdot (x \oplus a))^{-1}$ [Equation 1]

In the above Equation 1, $x^{-1}$ means a product inverse function of a binary field $GF(2^8)$ and A means an affine transform of $GF(2^8)$.

Even when the S-box used in the symmetric algorithm is at least two, the S-box may be decomposed into the product inverse function $x^{-1}$, another affine transform, and constant XOR.

For example, the ARIA may use two S-boxes ($S_1$, $S_2$) and an inverse function ($S_1^{-1}$, $S_2^{-1}$) of the S-box, wherein each S-box may be represented by the following Equation 2.

$S_1(x) = A \cdot x^{-1} \oplus a$, $S_1^{-1}(x) = (A^{-1} \cdot (x \oplus a))^{-1}$ $S_2(x) = D \cdot x^{-1} \oplus b$, $S_2^{-1}(x) = (D^{-1} \cdot (x \oplus b))^{-1}$ [Equation 2]

In Equation 2, values A, a, D, b are represented by the following Equations 3 to 6.

$$A = \begin{pmatrix} 1&0&0&0&1&1&1&1 \\ 1&1&0&0&0&1&1&1 \\ 1&1&1&0&0&0&1&1 \\ 1&1&1&1&0&0&0&1 \\ 1&1&1&1&1&0&0&0 \\ 0&1&1&1&1&1&0&0 \\ 0&0&1&1&1&1&1&0 \\ 0&0&0&1&1&1&1&1 \end{pmatrix}$$ [Equation 3]

$$D = \begin{pmatrix} 0&1&0&1&0&1&1&1 \\ 0&0&1&1&1&1&1&1 \\ 1&1&1&0&1&1&0&1 \\ 1&1&0&0&0&0&1&1 \\ 0&1&0&0&0&0&1&1 \\ 1&1&0&0&1&1&1&0 \\ 0&1&1&0&0&0&1&1 \\ 1&1&1&1&0&1&1&0 \end{pmatrix}$$ [Equation 4]

$$a = \begin{pmatrix} 1 \\ 1 \\ 0 \\ 0 \\ 0 \\ 1 \\ 1 \\ 0 \end{pmatrix}$$ [Equation 5]

$$b = \begin{pmatrix} 0 \\ 1 \\ 0 \\ 0 \\ 0 \\ 1 \\ 1 \\ 1 \end{pmatrix}$$ [Equation 6]

However, when mainly implementing the symmetric key encryption with software, the product inverse function $x^{-1}$ operation and the affine transform operation are operation having high time complexity, such that the S-box function is stored in a table form and the implementation efficiency is increased by a look-up manner of the S-box function.

Further, when applying the masking mechanism for coping with the power analysis attacks, a value that is MS $(x \oplus r) = S(x) \oplus r'$ (r, r' are an input masked value and an output masked value) for each S-box (in the case of 8 bit Sbox in 128 bits symmetric key, 16) is required for each round.

To this end, there is a need to generate the masked S-box table satisfying the above Equation. For this, much operation time and an additional memory are required.

Figure 2:
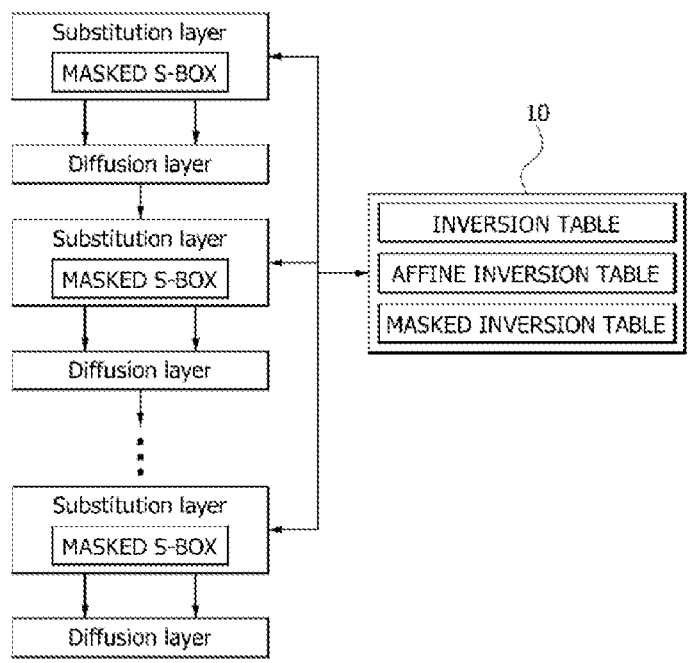
FIG. 2 is a block configuration diagram of an apparatus for implementing a symmetric key encryption algorithm against power analysis attacks in accordance with an embodiment of the present invention.
Figure 3:
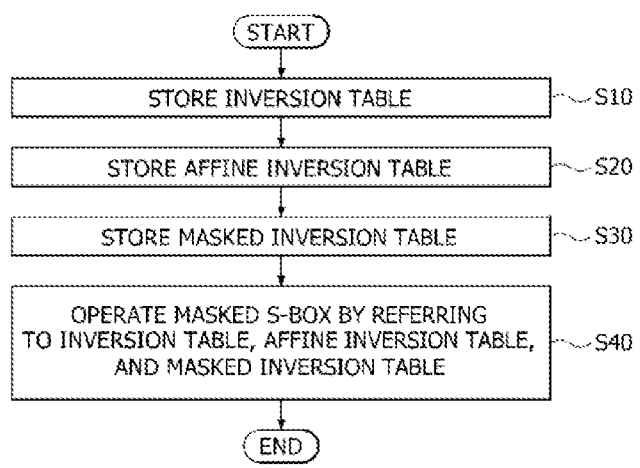
FIG. 3 is a flow chart of a method for implementing a symmetric key encryption algorithm against power analysis attacks in accordance with an embodiment of the present invention.
Figures 4, 5:
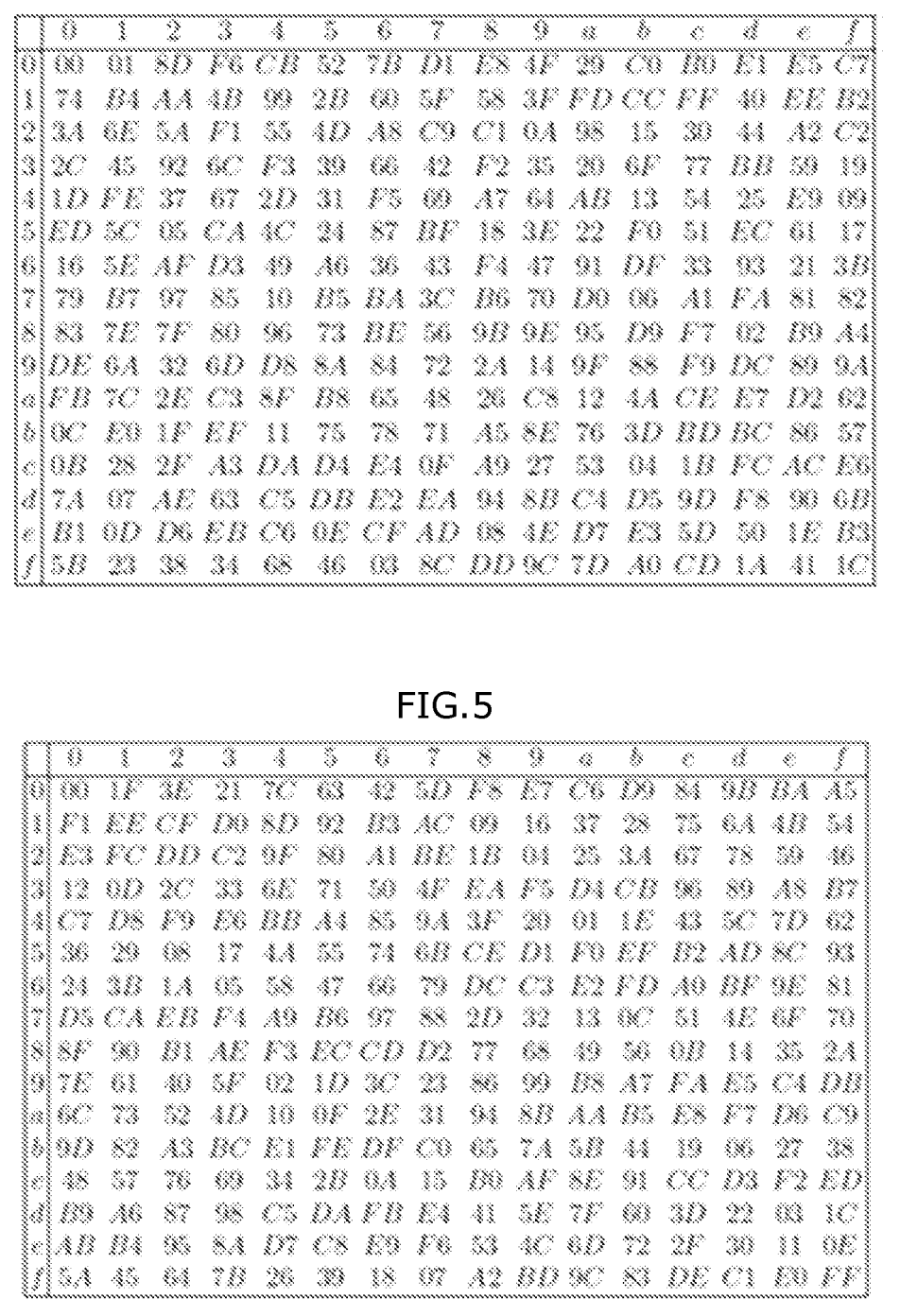
Figures 6, 7:
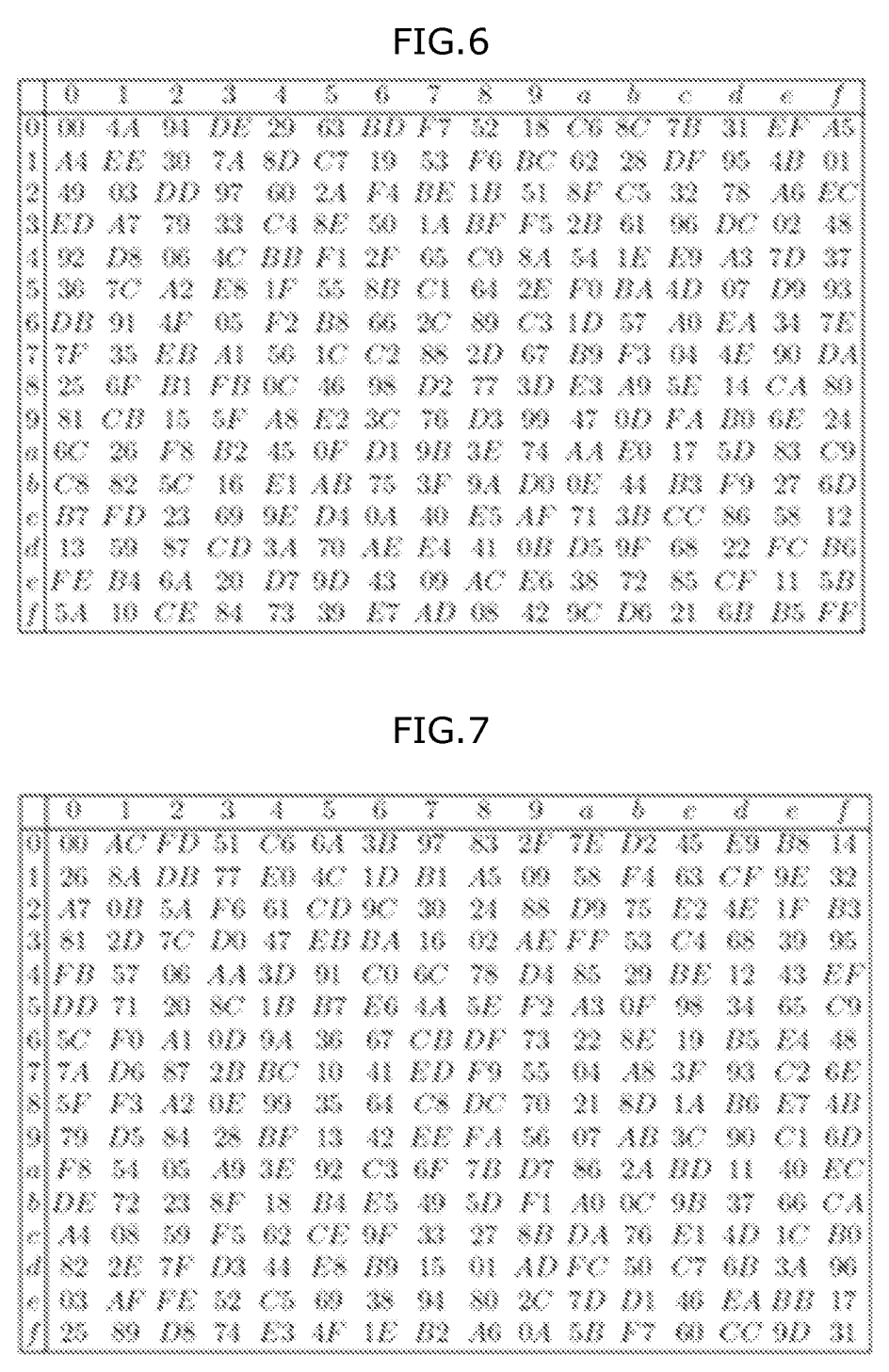
Figure 8:
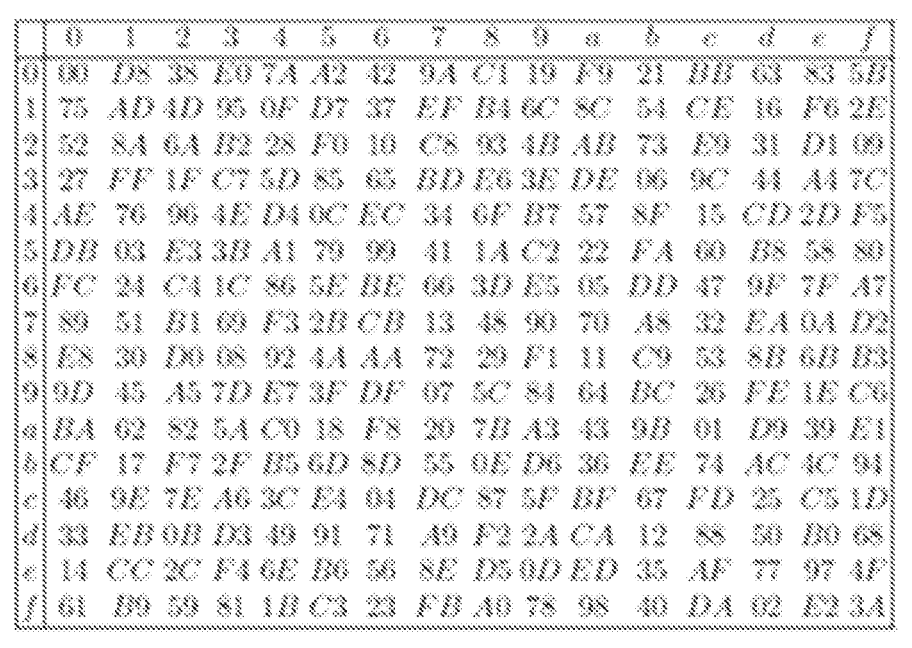

FIG. 2 is a block configuration diagram of an apparatus for implementing a symmetric key encryption algorithm against power analysis attacks in accordance with an embodiment of the present invention, FIG. 3 is a flow chart of a method for implementing a symmetric key encryption algorithm against power analysis attacks in accordance with an embodiment of the present invention, FIG. 4 is a diagram illustrating a inversion table of FIG. 3, FIG. 5 is a diagram illustrating an affine transform table of FIG. 3, FIG. 6 is a diagram illustrating an $A^{-1}$ affine transform table of FIG. 3, FIG. 7 is a diagram illustrating a D affine transform table of FIG. 3, and FIG. 8 is a diagram illustrating a $D^{-1}$ affine transform table of FIG. 3.

Referring to FIG. 2, an apparatus for implementing a symmetric key encryption algorithm against power analysis attacks in accordance with an embodiment of the present invention includes a substitution layer that is provided for each round of the ARIA to substitute an input value using a non-linear function S-box and transfers the result value to a diffusion layer and a memory unit 10 that stores an inversion table, an affine transform table, and a masked inversion table so as to operate the masked S-box in the substitution layer. As the memory unit 10, a read only memory may be adopted.

The inversion table, the affine transform table, and the masked inversion table are previously stored and are commonly used in each substitution layer for each round.

To this end, the memory unit 10 stores the inversion table for the product inverse function $x^{-1}$ and stores the affine transform table for affine transform.

Further, the memory unit stores the masked inversion table generated by using $x^{-1}$.

Next, the masked S-box for the input masked value and the output masked value (r, r') selected for each S-box of each round is operated by using the inversion table, the affine transform table, and the masked inversion table.

Hereinafter, this will be described in detail with reference to FIGS. 3 to 8.

First, as illustrated in FIG. 3, the memory unit 10 stores the inversion table of FIG. 4 for the product inverse function $x^{-1}$ of GF ($2^8$) (S10).

Next, as illustrated in FIGS. 5 to 8, the memory unit 10 generates and stores the affine transform table for the affine transform such as A and $A^{-1}$, D and $D^{-1}$, or the like (S20).

Next, the memory unit 10 stores the masked inversion table (S30).

In order to store the masked inversion table, the masked inversion table is generated using the following Equation 7.

$$MI(x \oplus r_0) := x^{-1} \oplus r'_0 \quad \text{[Equation 7]}$$

In Equation 7, the masked inversion table(MI) is generated by XORing the inversion table for the product inverse function $x^{-1}$ of the binary field GF($2^8$) and the output masked value.

Finally, the masked S-box for the input masked value r and the output masked value r' selected for each S-box of each round is operated using the affine transform table and the masked inversion table as the following Equation 8 (S40).

$$MS(x')=A \cdot MI(x'' \oplus r) \oplus a',$$

$$MS^{-1}(x')=MI(A^{-1} \cdot (x' \oplus a) \oplus b) \oplus c, \quad \text{[Equation 8]}$$

Here, MS(x') is the masked S-box(MS:function), $MS^{-1}$(x') is inverse of the masked S-box, A is A affine transform table, $A^{-1}$ is $A^{-1}$ affine transform table(inverse of A), a is a constant, b is a constant, c is a 8-bit constant, x' is an input variable of the S-box of 8-bit, x'' is a value of 8-bit, a' is a 8-bit constant, and r is an input masked value of random value of 8-bit.

And, the S-box is $S(x)=A \cdot x^{-1} \oplus a$, $x'=x \oplus r$, $x''=x' \oplus r_0$, $a'=r' \oplus A \cdot r' \oplus a$, $b=A^{-1} \cdot r \oplus_0$, and $c=r'_0 \oplus r'$, where $r_0$ and $r'_0$ are random values of 8-bit used in defining the Masked Inversion and r' is a random value of 8-bit as an output masked value.

When performing the operation as described above, the result of the masked S-box becomes a value of the following Equation 9.

$$\begin{aligned} MS(x') &= A \cdot (x^{-1} \oplus r'_0) \oplus (r' \oplus A \cdot r'_0 \oplus a) \quad \text{[Equation 9]} \\ &= (A \cdot x^{-1} \oplus a) \oplus r' \\ &= S(x) \oplus r' \\ &= (A^{-1} \cdot (x \oplus a))^{-1} \oplus r'_0 \oplus (r'_0 \oplus r') \\ &= S^{-1}(x) \oplus r' \\ MS^{-1}(x') &= MI(A' \cdot (x' \oplus a) \oplus A^{-1} r \oplus r_0) \oplus (r'_0 \oplus r') \\ &= MI(A^{-1} \cdot (x \oplus a) \oplus r_0) \oplus (r'_0 \oplus r') \\ &= (A^{-1} \cdot (x \oplus a))^{-1} \oplus r'_0 \oplus (r'_0 \oplus r') \\ &= S^{-1}(x) \oplus r' \end{aligned}$$

Therefore, the result satisfies MS $(x \oplus r)=S(x) \oplus r'$ and MS-1 $(x \oplus r)=S-1$ $(x) \oplus r'$.

Therefore, the masked S-box table for each masked S-box of each round is generated and thus, the consumed memory and the execution time can be reduced, thereby making it possible to efficiently implement the algorithm against the power analysis attacks.

For reference, the embodiment of the present invention illustrates the ARIA algorithm that is one of the national standard symmetric key encryption algorithm, but the technical scope of the present invention is not limited thereto and therefore, may also be applied to the encryption algorithm using at least two S-boxes, for example, an advanced encryption standard (AES), or the like.

The embodiments of the present invention can reduce the memory consumption and the execution time by previously generating and storing the masked inversion table and the affine transform table and calculating the making S-box using the generated and stored tables.

The embodiments of the present invention have been disclosed above for illustrative purposes. Those skilled in the art will appreciate that various modifications, additions and substitutions are possible, without departing from the scope and spirit of the invention as disclosed in the accompanying claims.

What is claimed is:

1. A method for implementing a symmetric key encryption algorithm against power analysis attacks, comprising:
   generating and storing an affine transform table;
   generating and storing a masked inversion table;
   operating a masked S-box using the affine transform table and the masked inversion table;
   wherein at the operating of the masked S-box using the affine transform table and the masked inversion table, the masked S-box is calculated for each round by using the affine transform table and the masked inversion table (MI) according to $$MS(x')=A \cdot MI(x'' \oplus r) \oplus a', MS^{-1}(x')=MI(A^{-1} \cdot (x' \oplus a) \oplus b) \oplus c,$$

and

MS(x') is the masked S-box, $MS^{-1}$(x') is inverse of the masked S-box, A is an affine transform table, $A^{-1}$ is inverse of the affine transform table, "a" is a constant, "b" is a constant, "c" is a 8-bit constant, x' is an input variable of the S-box of 8-bit, x'' is a value of 8-bit, a' is a 8-bit constant, and r is an input masked value.

2. The method of claim 1, wherein the masked inversion table is generated using a inversion table for a product inverse function of the binary field $GF(2^8)$ and an output masked value.

3. The method of claim 2, wherein the inversion table for the product inverse function of $GF(2^8)$ is pre-stored.

4. The method of claim 2, wherein the masked inversion table is generated by XORing the inversion table and the output masked value.

5. The method of claim 1, wherein the affine transform table includes an affine transform table of an affine transform A of the binary field $GF(2^8)$, $A^{-1}$ affine transform table, D affine transform table and $D^{-1}$ affine transform table.

6. The method of claim 1, wherein the operating of the masked S-box using the affine transform table and the masked inversion table commonly uses the affine transform table and the masked inversion table for each round.

\* \* \* \* \*